United States Patent [19]

Krieger et al.

[11] Patent Number: 4,700,543
[45] Date of Patent: * Oct. 20, 1987

[54] CASCADED POWER PLANT USING LOW AND MEDIUM TEMPERATURE SOURCE FLUID

[75] Inventors: Zvi Krieger, Tel Aviv; Alex Moritz, Holon, both of Israel

[73] Assignee: Ormat Turbines (1965) Ltd., Yavne, Israel

[*] Notice: The portion of the term of this patent subsequent to Apr. 1, 2003 has been disclaimed.

[21] Appl. No.: 813,724

[22] Filed: Dec. 27, 1985

Related U.S. Application Data

[63] Continuation-in-part of Ser. No. 631,058, Jul. 16, 1984, Pat. No. 4,578,953.

[51] Int. Cl.⁴ ............................................. F01K 23/02
[52] U.S. Cl. .................................... 60/655; 60/698
[58] Field of Search ................................ 60/655, 698

[56] References Cited

U.S. PATENT DOCUMENTS 2,593,963 4/1952 Biggs .
3,795,103 3/1974 Anderson ............................ 60/651
4,578,953 4/1986 Krieger et al. ...................... 60/655

Primary Examiner—Allen M. Ostrager
Attorney, Agent, or Firm—Sandler & Greenblum

[57] ABSTRACT

A plurality of independent, closed Rankine cycle power plants, each of which has a vaporizer, is operated by serially applying a medium or low temperature source fluid to the vaporizers of the power plants for producing heat depleted source fluid. A preheater is provided for each vaporizer; and said heat depleted source fluid is applied to all of the preheaters in parallel. The heat depleted source fluid thus serves to heat the operating fluid to the evaporization temperature, while the source fluid applied to the vaporizers supplies the latent heat of vaporization to the operating fluid of the power plant. The present invention is advantageous, as compared to a conventional cascaded power plant of the type described, because the temperature drop of the source fluid can be increased without reducing the efficiency. Alternatively, the temperature drop can be maintained but the efficiency can be increased. In either case, the power produced by the power plant according to the present invention is increased.

10 Claims, 5 Drawing Figures

CASCADED POWER PLANT USING LOW AND MEDIUM TEMPERATURE SOURCE FLUID

This application is a continuation-in-part of copending application Ser. No. 631,058 filed July 16, 1984 now U.S. Pat. No. 4,578,953.

FIELD OF THE INVENTION

This invention relates to an improved cascaded power plant using low and medium temperature source fluid.

DESCRIPTION OF PRIOR ART

Low and medium temperature source fluids, hereinafter termed source fluids of the type described, are those fluids with a temperature less than about 350° F., such as geothermal fluids obtained from many production wells, and industrial liquids produced by various industrial processes. The East Mesa Development Project located in the Imperial Valley of Southern California near Holtville presently has six wells capable of producing about 4 million pounds per hour of geothermal fluid at about 324° F. Such geothermal fluid is an example of source fluid of the type described.

Conventionally, electricity is produced from source fluids of the type described using a closed Rankine cycle heat engine whose operating fluid is an organic fluid (e.g., Freon), such system being termed a power plant of the type described. A source fluid of the type described is applied to a vaporizer of a power plant of the type described containing liquid organic fluid whereby the latter is converted into a vapor. The vapor is expanded in a turbogenerator that converts some of the heat in the vapor to work and produces heat depleted organic vapor that is condensed in a condenser. The condensed organic fluid is returned to the vaporizer, and the cycle repeats.

The condenser rejects the remaining heat in the heat depleted vapor into ambient air, if an air cooled condenser is involved, or into cooling water, if a water cooled condenser is used. Typically, the vaporizer is operated at a pressure that produces saturated or only slightly superheated vapor because the pressures involved are relatively low and the design of the heat exchanger that constitutes the vaporizer, the piping for conveying the vapor, and the turbine, are simplified. In order to maximize power output of a power plant of the type described, the temperature drop of the source fluid across the entire heat exchanger system of the power plant, and the evaporization temperature in the vaporizer must be optimized.

The conventional cascaded power plant utilizes a plurality of closed Rankine cycle power plant modules each having an associated heat exchanger, the source fluid being serially applied to the heat exchangers of each module. Whatever system is used, maximizing the net power produced by the system is of paramount importance. One technique for increasing the power is to extract more heat from the source fluid by increasing its temperature drop. With either a single stage or cascaded system, however, increasing the amount of heat extracted from the source fluid by increasing the temperature drop of the source fluid across the heat exchanger system has the effect of decreasing efficiency of the power plant because the mean temperature of the source fluid is reduced. This results in a reduction of the evaporization temperature of the operating fluid in the heat exchanger, thus reducing the Carnot efficiency of the power plant.

In an effort to increase the efficiency of a power plant of the type described, and to extract more power from the source fluid, it has been proposed to operate at super critical temperatures and pressures. In such case, the temperature of the vaporized organic fluid produced by the heat exchanger system is higher than in the above-described typical Rankine cycle power plant. While this approach is effective to increase the efficiency of the power plant and to increase its work output, the gains are offset by the higher cycle pump power consumption, as well as increased cost and complexity of the power plant whose pressure vessels must be designed to operate at pressures in the range of 500–600 psia.

It is therefore an object of the present invention to provide a new and improved power plant of the type described which can be operated more efficiently than a conventional low pressure power plant.

BRIEF DESCRIPTION OF INVENTION

The present invention provides a method for operating a plurality of independent, closed Rankine cycle power plant modules, each of which has a vaporizer, the method comprising the steps of serially applying a medium or low temperature source fluid to the vaporizers of the power plants for producing heat depleted source fluid, providing a preheater for each vaporizer, and applying said heat depleted source fluid to all of the preheaters in parallel. The heat depleted source fluid thus serves to heat the operating fluid to the evaporization temperature, while the source fluid applied to the vaporizers supplies the latent heat of vaporization to the operating fluid of the power plant.

The present invention is advantageous, as compared to a conventional cascaded power plant of the type described, because the temperature drop of the source fluid can be increased without reducing the efficiency. Alternatively, the temperature drop can be maintained but the efficiency can be increased. In either case, the power produced by the power plant according to the present invention is increased.

BRIEF DESCRIPTION OF DRAWINGS

An embodiment of the present invention is shown in the accompanying drawings wherein.

DETAILED DESCRIPTION

Figure 1:
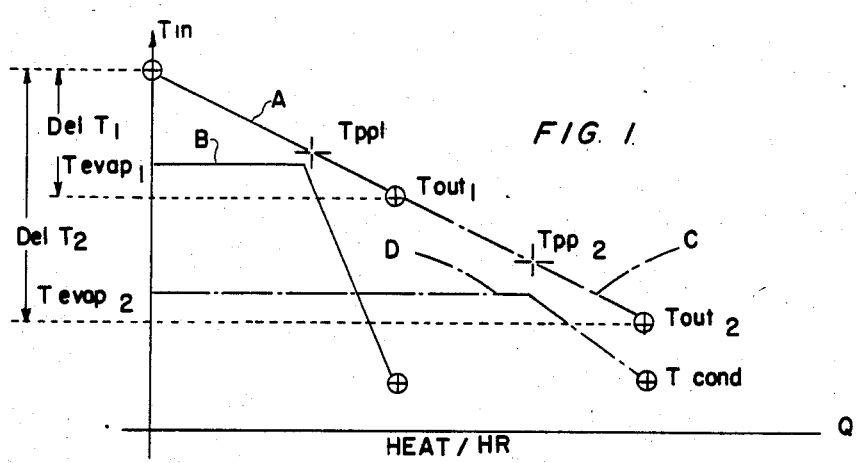
FIG. 1 is a plot of temperature versus heat input for a heat exchanger in a power plant of the type described showing the relationship between the temperature drop of the source fluid and the evaporization temperature of the operating fluid.

The problem with the prior art, which is solved by the present invention, is illustrated in FIG. 1 to which reference is now made. The plot shows the variation in temperature of source fluid as a function of the rate of heat applied to a heat exchanger in a single-stage power plant of the type described. Curve A represents the cooling of source fluid in a heat exchanger from temperature $T_{in}$, at the entrance to the heat exchanger, to temperature $T_{out1}$, at the outlet of the heat exchanger, where $T_{in} - T_{out1} = Del\ T_1$. In a known way, the evaporization temperature $T_{evap1}$ of the operating fluid, whose variation is indicated by curve B, is determined by the temperature of the operating fluid entering the heat exchanger, $T_{cond}$, and $Del\ T_1$. The ratio $a_1/b_1$ is termed the percentage of preheat for the heat exchanger, which is the ratio of the amount of heat per unit time required to raise the operating fluid from the condenser temperature to the vaporization point (remaining in liquid form), to the total amount of heat per unit time required to evaporate the operating fluid. For source fluids of the type described, this ratio may range from 25% to 55%.

The difference between temperature $T_{pp1}$ of the source fluid at the break-point of curve B, and $T_{evap}$ is termed the pinch-point temperature; and this temperature is conventionally in the range 8°–12° F. It can be shown that reducing the pinch-point temperature to increase the evaporation temperature has the effect of increasing the efficiency of the system, because the Carnot efficiency is proportional to the ratio of the difference between the evaporation and the condenser temperatures to the evaporization temperature in absolute units. However, it can be shown that increasing the Carnot efficiency in this manner will occur at the expense of the disproportionately large increase in surface area of the heat exchanger.

To increase the power output of a power plant using an operating fluid according to curve B and a source fluid cooled according to curve A, increasing the temperature drop of the source fluid may be appropriate. In such case, the source fluid is cooled according to curve C from $T_{in}$ to $T_{out2}$; and the operating fluid will then be described by curve D. That is to say, $T_{evap2}$ will be lower than $T_{evap1}$. Moreover, it can be shown that while the heat extracted from the source fluid increases as the cooling of the source fluid increases, the efficiency of the system will decrease. Whether the power output increases will depend upon the rate at which cooling of the source fluid occurs in the heat exchanger. The problem of increasing the power output is addressed and solved by the present invention.

Figure 2:
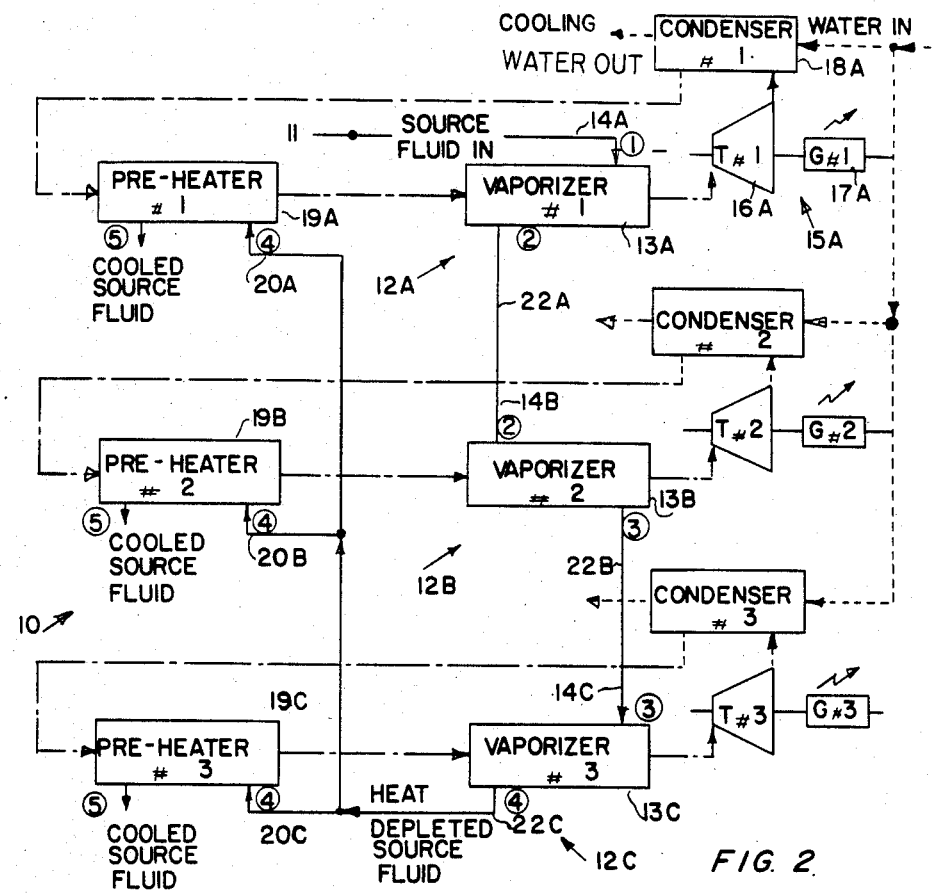
FIG. 2 is a block diagram of a cascaded power plant according to the present invention.

Referring now to FIG. 2, reference numeral 10 designates a power plant according to the present invention. Power plant 10 comprises a plurality of independent closed, Rankine cycle organic fluid power plant modules 12A, 12B and 12C. Three such power plant modules are shown; but the invention is applicable to two or more independent power plant modules. Each of these modules is identical and as a consequence, only module 12A is described in detail. This module includes vaporizer 13A containing an organic liquid, and to which a low or medium temperature source fluid from source 11 is applied via inlet 14A. The organic liquid contained within vaporizer 13A is vaporized producing essentially saturated or slightly superheated vapor which is applied to turbine 16A of turbogenerator 15A. The vapor expands in turbine 16A, and some of the heat contained in the vapor is converted into work as generator 17A produces electrical power. The vapor exhausted from turbine 16A is applied to condenser 18A wherein the vapor is condensed into liquid by the application to the condenser of cooling water. Alternatively, an air cooled condenser can be used.

By means of a pump (not shown), condnsate from condenser 18A is transferred into preheater 19A that may be a physical part of, or separate from vaporizer 13A. Heat depleted source fluid, obtained from the outlet from the vaporizer of the third module, is applied to preheater 19A at inlet 20A to the preheater; and the cooled source fluid is transferred at outlet 21A. If the source fluid is geothermal, the cooled fluid may be transferred to a rejection well; or, if the source fluid is an industrial chemical, the cooled fluid may be transferred back to the process.

As shown in FIG. 2, source fluid that exits from vaporizer 13A at outlet 22A is applied to the inlet 14B of vaporizer 13B of power plant module 12B; and the source fluid that exits from vaporizer 13B at outlet 22B is applied to inlet 14C of vaporizer 13C of module 12C. The source fluid that exits from vaporizer 13C at 22C is, hereinafter, termed heat depleted source fluid because of the heat extracted in each of vaporizers 13A, 13B and 13C. This heat depleted fluid is applied to each of the preheaters 19A, 19B and 19C, in parallel. That is to say, the present invention provides for serially applying a low or medium temperature source fluid from source 11 to vaporizers 13A, 13B, and 13C of power plants 12A, 12B, 12C for producing heat depleted source fluid which appears at the outlet 22C of vaporizer 13C; and, the heat depleted source fluid is applied to each preheater 19A, 19B, and 19C in parallel. The source fluid that exits from the preheaters is conveyed to a rejection well if the source fluid is geothermal.

Figure 3:
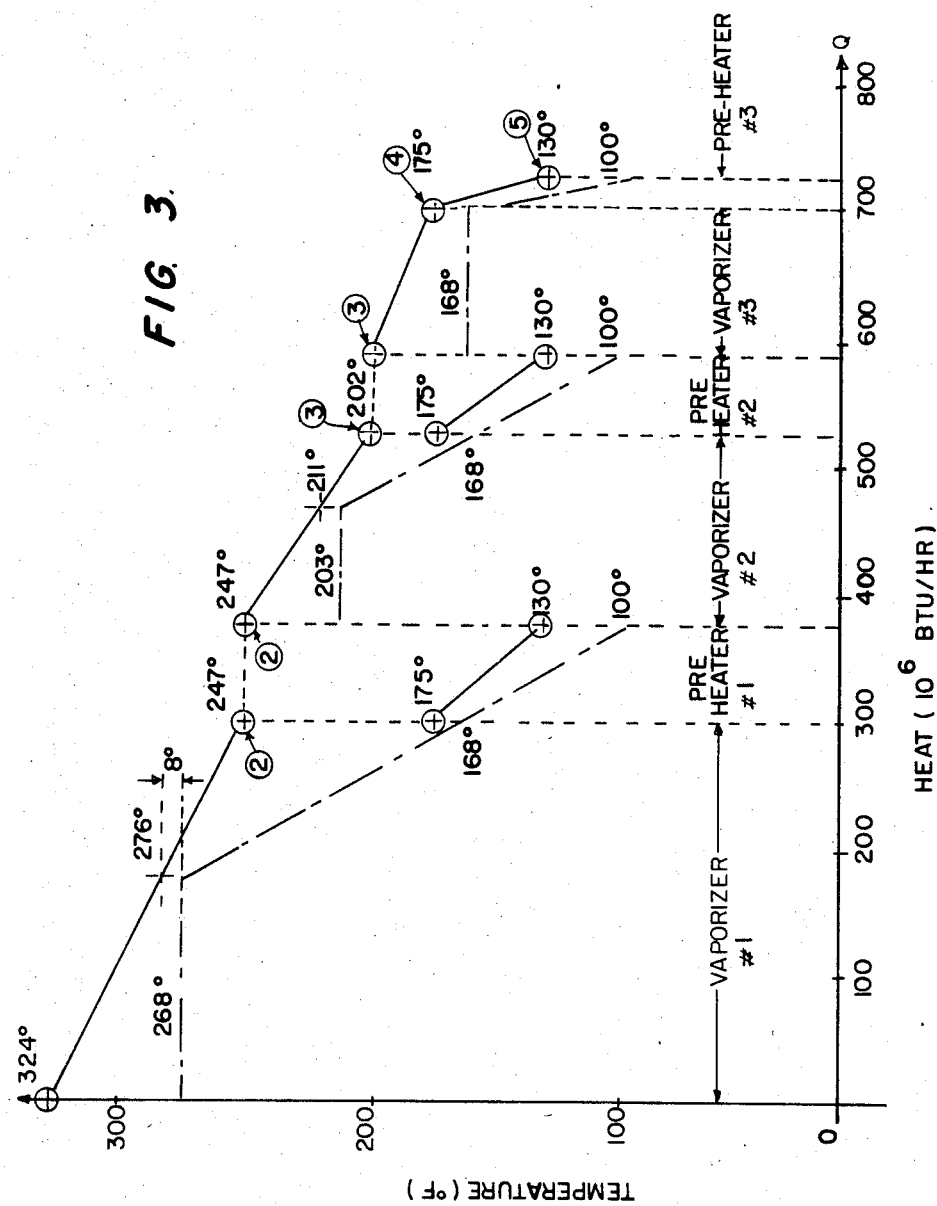
FIG. 3 is a plot similar to FIG. 1 showing the temperatures at various locations in the block diagram of FIG. 2.

FIG. 3 shows a typical temperature-heat diagram for a power plant like that shown in FIG. 2 capable of operating with geothermal fluid produced by the East Mesa Field described above. The values of temperature and flow rates are based on the current capability of the East Mesa Field and are for the purpose of comparing the power produced by a power plant according to the present invention and a conventional cascaded power plant using heat exchangers with the same total area.

Approximately 3.7 million pounds per hour of geothermal fluid is available for serial input to vaporizers 13A, 13B and 13C; about half of the heat depleted geothermal fluid that exits from vaporizer 13C is applied to preheater 19A, about ⅓ is applied to preheater 19B, and the balance to preheater 19C. It is assumed that the condenser conditions ar such that the temperature of the organic fluid that exits from the condenser of each module of the power plant is 100° F., that the temperature of the heat depleted geothermal fluid exiting from vaporizer 13C is 175° F., and that the heat depleted geothermal fluid is further cooled on passing through each preheater to 130° F.

Geothermal fluid enters vaporizer 13A at 324° F. and is cooled by transit through the vaporizer to a temperature of 247° F. The organic liquid contained within vaporizer 13A is heated in temperature from 168° F. to 268° F. which is the evaporation temperature for power plant module 12A. This provides a pinch point temperature of about 8° F. The temperature of the geothermal fluid that exits from vaporizer 13C is 175° F. and the geothermal fluid is cooled from this temperature to 130° F. in each of preheaters 19A, 19B, and 19C. Thus, for power plant module 12A, the geothermal fluid is cooled from 175° F. to 130° F. while the organic liquid in the preheater is warmed from 100° F. to 168° F.

The evaporation temperature in power plant 12B is 203° F. which, of course, is less than the evaporation temperature in power plant 12A. Thus, the operating pressure of power plant 12B is less than the operating pressure in power plant 12A. Similarly, the evaporation temperature in power plant 12C is 168° F. which is the lowest temperature of the three power plants.

Figure 4:
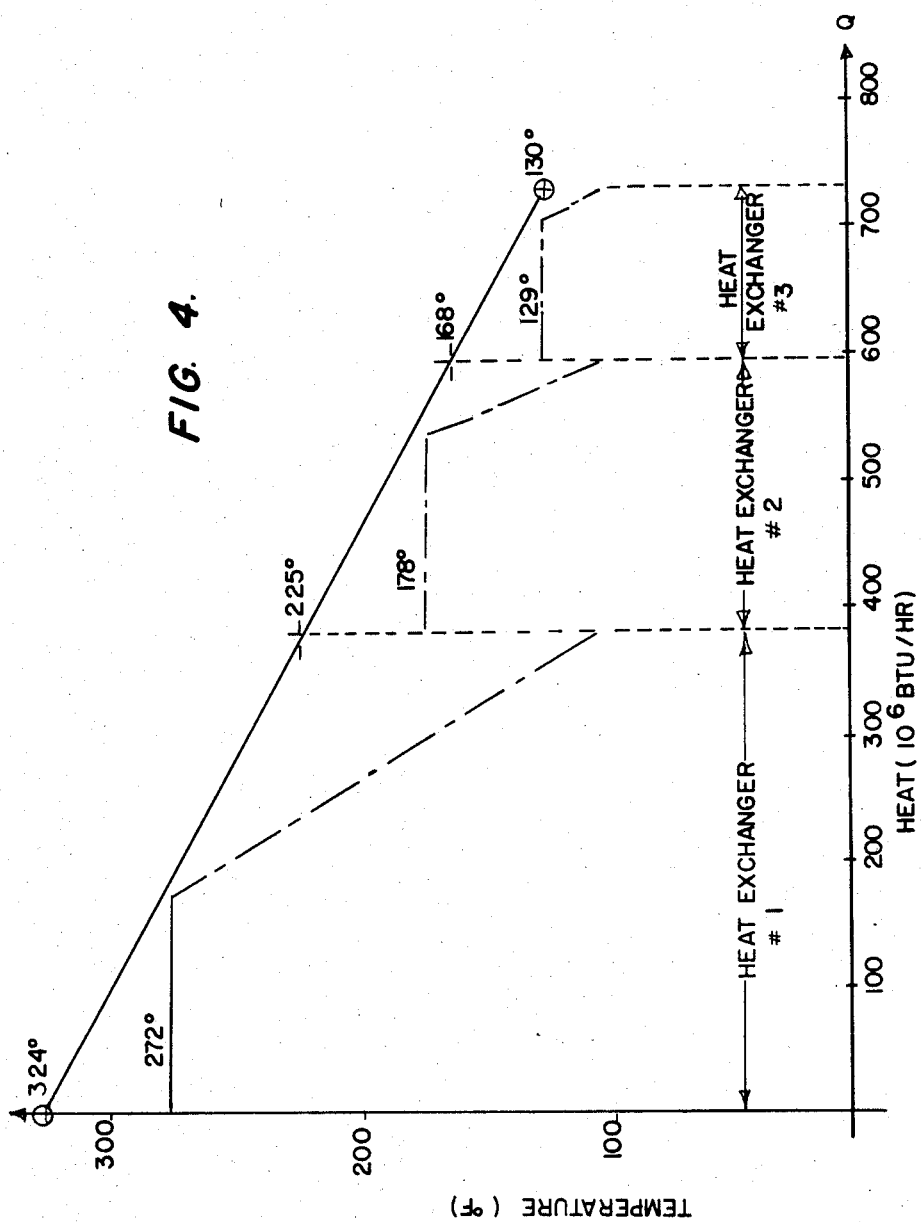
FIG. 4 is a plot like that of FIG. 3 for a conventionally cascaded power plant having the same heat exchanger area as the power plant whose operation is shown in FIG. 3.

It can be shown that the overall log-mean-temperature-difference (LMTD) for the heat exchangers of modules 12A, 12B and 12C is about 23° F., about 19° F., and about 16° F., respectively. Furthermore, it can be shown that the Carnot efficiency for the power plant illustrated in FIG. 3 is about 18.5%. A conventional three-stage cascaded power plant having heat exchangers of substantially the same area as the power plant of FIG. 3 will have a temperature-heat diagram like that shown in FIG. 4. In such conventional power plant, the geothermal fluid is cooled from 324° F. to 130° F. in one serial pass through the heat exchangers. In the three modules, the evaporation temperature will be 272° F., 178° F., AND 129° F., respectively. The geothermal fluid will have a temperature of 225° F. entering the heat exchanger of the second module, and a temperature of 168° F. entering the third module. In such case, it can be shown that the LMTD of each module of such a cascaded system is about 23° F., 19° F., and 17° F., respectively. This establishes that the surface area of the heat exchangers in the conventional system is almost identical to the surface area of the heat exchangers of the power plant according to the present invention. However, the Carnot efficiency of the conventionally cascaded power plant is only about 16.7%. Thus, a power plant according to the present invention, with the same sized heat exchangers as in a conventional cascaded power plant will produce over 10% more power without a significant increase in cost.

Figure 5:
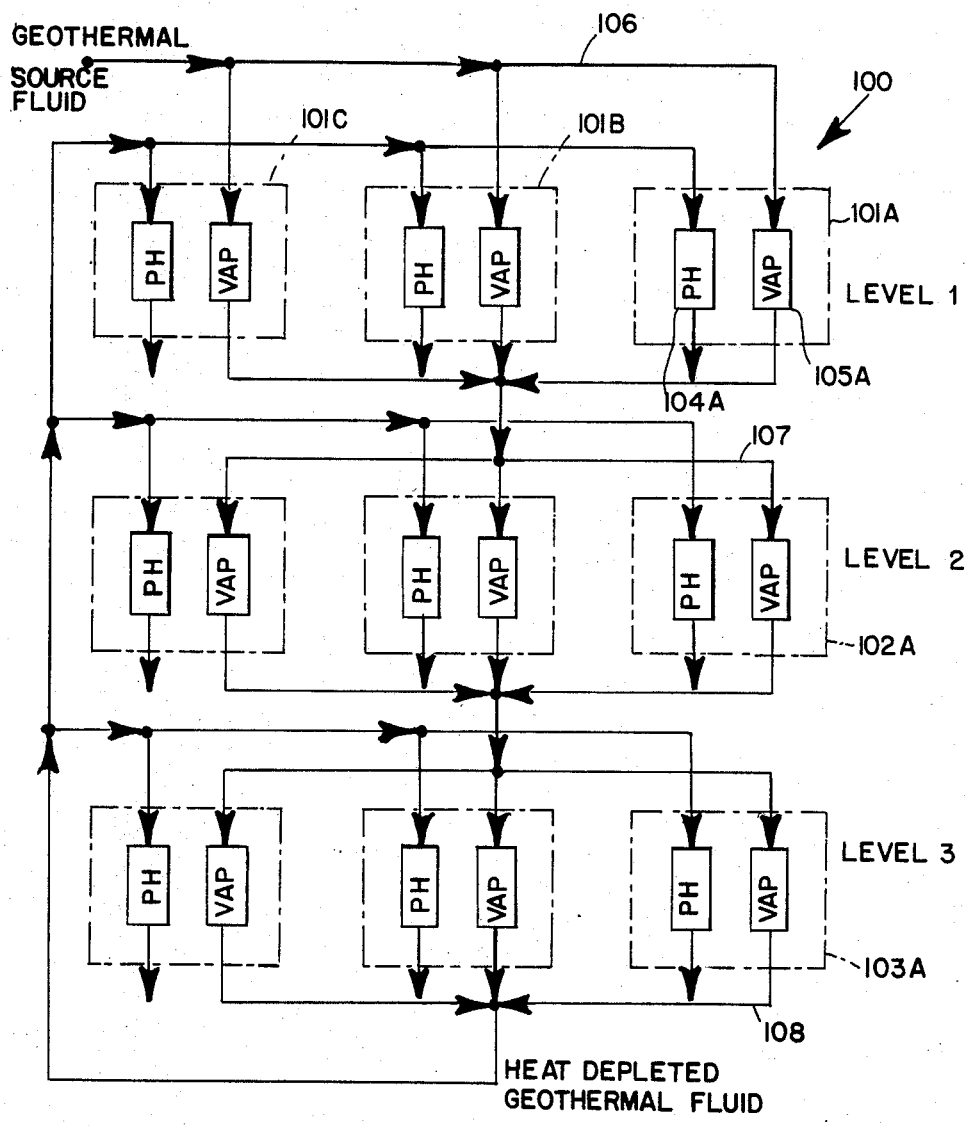
FIG. 5 is a second embodiment of a cascaded power plant according to the present invention showing a plurality of modular energy converters arranged in multiple levels.

A second embodiment of the invention is shown in FIG. 5 wherein a plurality of modular energy converters like those shown in FIG. 2 are organized so as to permit a power plant of almost any capacity to be constructed by selecting a suitable number of converters. Power plant 100 shown in FIG. 5 thus comprises a plurality of modules arranged in a plurality of levels. Three levels are shown in the drawing, but both the number of levels, and the number of modules in each level are selected in accordance with the required capacity of the power plant. Thus, as an example only, the power plant shown in FIG. 5 comprises nine modules arranged in three levels of three modules each.

Each module 101A-C in level 1, each module 102A-C in level 2, and each module 103A-C in level 3, comprises a vaporizer, a preheater, an organic fluid turbogenerator (not shown), and a condenser (not shown) organized in the manner shown in FIG. 2. Thus, in module 101A, for example, an organic fluid, such as Freon or the like, is heated and transferred to vaporizer 105A where vaporization takes place. The vaporized organic fluid is piped to the turbogenerator where expansion takes place driving an electrical generator which produces power, and heat depleted vapor that is condensed in the condenser of the module and returned to the preheater.

According to the present invention, geothermal source fluid from a well (not shown) is applied in parallel via header 106 to each vaporizor in the level 1 modules, collected at the exit of these modules, and then applied in parallel via header 107 to the vaporizers in the level 2 modules, etc. The heat depleted geothermal fluid is collected in header 108 at the outlet of the level 3 vaporizers and applied, in parallel to all of the preheaters. Thus, each column of the three vertically aligned modules shown in FIG. 5 corresponds to the arrangement shown in FIG. 2. A power plant organized like that shown in FIG. 5 is particularly useful when the source of geothermal fluid produces fluid in sufficient volume to supply multiple power plants arranged like that shown in FIG. 2.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. A power plant operating on a source of low or medium temperature fluid comprising:
    (a) a plurality of closed Rankine cycle power plant modules each having a vaporizer associated therewith responsive to source fluid for converting operating fluid of the power plant modules to vapor, said modules being arranged in a plurality of levels, each level comprising a plurality of modules;
    (b) means for applying source fluid in parallel to each vaporizer in a level to produce heat depleted source fluid, means for applying heat depleted source fluid from a level to each vaporizer in parallel in the succeeding level;
    (c) a preheater associated with each vaporizer for preheating operating fluid that is vaporized in the associated vaporizer; and
    (d) means for applying heat depleted source fluid from the lowest level to all of the preheaters in parallel.

2. Apparatus according to claim 1 constructed and arranged so that the modules are arranged into a plurality of levels, including means for applying the heat depleted source fluid to all of the preheaters in parallel independently of the levels of the preheaters.

3. Apparatus according to claim 1 including means for applying the heat depleted source fluid to all of the preheaters in parallel independently of the levels of the preheaters.

4. A power plant according to claim 1 wherein said source is an industrial fluid.

5. A power plant according to claim 1 wherein said source is industrial waste heat fluid.

6. A method for operating a plurality of independent, closed cycle power plant modules, each having a vaporizer and a preheater, said method comprising the steps of:
    (a) arranging the modules into a plurality of levels, each level comprising a plurality of modules;
    (b) applying a medium or low temperature source fluid in parallel to each vaporizer in a level to produce heat depleted source fluid;
    (c) applying heat depleted source fluid from an upper level to each vaporizer in parallel in the succeeding lower level; and
    (d) applying heat depleted fluid from the lowest level to all of the preheaters in parallel.

7. A method according to claim 6 including the step of arranging the modules into a plurality of levels, and applying the heat depleted source fluid to all of the preheaters in parallel independently of the levels of the preheaters.

8. A method according to claim 6 including the step of applying the heat depleted source fluid to all of the preheaters in parallel independently of the levels of the preheaters.

9. A method according to claim 6 wherein the source fluid is an industrial fluid.

10. A method according to claim 6 wherein the source fluid is industrial waste heat.

* * * * *

UNITED STATES PATENT AND TRADEMARK OFFICE
CERTIFICATE OF CORRECTION

PATENT NO. : 4,700,543

DATED : October 20, 1987

INVENTOR(S) : Zvi KRIEGER and Alex MORITZ

It is certified that error appears in the above-identified patent and that said Letters Patent is hereby corrected as shown below:

On the cover page of the printed patent, please insert the following priority information.
---[-30-] Foreign Application Priority Data
February 21, 1985 [NZ] New Zealand 211181---

At column 3, line 21 of the printed patent, "T evap" should be changed to ---T evap 1---. This change is necessary in order to make the text correspond to the drawings.

At column 4, line 3 of the printed patent, "condnsate" should be changed to ---condensate---;

At column 4, line 49 of the printed patent "ar such" should be changed to ---are such---; and At column 5, line 65 of the printed patent, "vaporizor" should be changed to ---vaporizer---.

Signed and Sealed this

Twelfth Day of July, 1988

Attest:

DONALD J. QUIGG

Attesting Officer

Commissioner of Patents and Trademarks